United States Patent [19]

Kennedy

[11] 4,417,998

[45] Nov. 29, 1983

[54] POLYURETHANE FOAMS AND PROCESSES FOR PREPARATION

[75] Inventor: Richard B. Kennedy, Ridgefield, Conn.

[73] Assignees: Patrick James Crehan; Richard J. Fricke, both of Ridgefield, Conn.

[21] Appl. No.: 496,418

[22] Filed: May 20, 1983

Related U.S. Application Data

[60] Division of Ser. No. 443,878, Nov. 23, 1983, which is a continuation-in-part of Ser. No. 328,686, Dec. 8, 1981.

[51] Int. Cl.$^3$ ............................................... H01J 7/18
[52] U.S. Cl. .............................. 252/182; 252/188.31; 521/175; 521/906; 521/155
[58] Field of Search .................... 252/182, 188.3 R; 521/175

[56] References Cited

U.S. PATENT DOCUMENTS

| | | | |
|---|---|---|---|
| 3,096,001 | 7/1963 | Boe et al. | 521/78 |
| 3,830,760 | 8/1974 | Bengtson | 521/107 |
| 4,107,069 | 8/1978 | Keller et al. | 252/182 |
| 4,136,046 | 1/1979 | Hirshman et al. | 252/182 |
| 4,225,453 | 9/1980 | De Paul et al. | 252/182 |
| 4,239,642 | 12/1980 | De Paul et al. | 252/182 |

*Primary Examiner*—Morton Foelak
*Attorney, Agent, or Firm*—Wyatt, Gerber, Shoup, Scobey & Badie

[57] ABSTRACT

Polyurethane foams which may be rendered flame resistant by the addition of flame retardants are produced by reaction between a carbohydrate, a polyisocyanate and water in the presence of a suitable surfactant and polyurethane forming catalyst.

9 Claims, No Drawings

POLYURETHANE FOAMS AND PROCESSES FOR PREPARATION

RELATED APPLICATION

This is a division, of application Ser. No. 443,878 filed Nov. 23, 1982; which in turn is a continuation-in-part application of my copending application Ser. No. 328,686 filed Dec. 8, 1981.

BACKGROUND OF THE INVENTION

The present invention relates to foam compositions which may be flame retardant and methods for making same wherein reaction pressures can be controlled during the foaming process. The foam may be produced with a variety of densities, tensile strength, cell structures and other physical properties.

Plastic foams have been utilized as thermal insulating materials, light weight construction materials, and flotation materials and for a wide variety of other uses because of their excellent properties. Heretofore, their use has been limited in environments where there is danger of fire because of their substantial fuel contribution, their contribution to rapid flame spread and the fact that they generate large quantities of noxious smoke on thermal decomposition when burned or heated to an elevated temperature. This has limited the commercial development of plastic foams. Large amounts of money and much research time have been expended in attempts to alleviate these problems.

With the present interest in conserving heating fuel, many existing buildings are installing additional insulation, and newly constructed buildings are including more insulation than was formerly used.

The most commonly used type of foam insulation for existing structures are urea formaldehyde foams, which are foamed in place between the outside wall and the inside wall of the structure. Unfortunately, the urea formaldehyde foam spontaneously decomposes, releasing formaldehyde fumes in quantities which may be toxic. The use of urea formaldehyde foams in construction is prohibited in some building codes for this reason.

Another type of material often used for insulation is polyurethane foam. However, polyurethane foam provides a substantial fuel contribution, spreads flame rapidly, and releases toxic gases including carbon dioxide, carbon monoxide and hydrogen cyanide when burned. The use of polyurethane foam for retrofit is not completely satisfactory because of the high reaction pressures generated during the foaming process, which can be sufficient to separate the wallboard from the wall studs.

Rigid polyurethane foams are generally prepared by reacting an organic polyisocyanate with a polyol. For most commercial purposes, the reaction is conducted in the presence of a foaming agent, surfactant, catalyst and possibly other ingredients. In order to reduce the cost of preparing these foams, efforts have been made to employ polysaccharides such as starch or cellulose as a polyol reactant in their preparation. The use of such substrates has been unsatisfactory because of the poor physical properties of the foams produced unless they have been modified in some way or supplemented with conventional industrial polyols. Oxyalkylated starch yields satisfactory foams, but the direct oxyalkylation of starch results in uncontrolled degradation or decomposition of the starch. When such products are used in the production of foams, the foams do not have uniform chemical or physical properties.

A satisfactory process for utilizing starch as a component in the preparation of polyurethane foams is disclosed in U.S. Pat. No. 3,277,213. In this process, starch is added to a polyhydric alcohol containing at least two hydroxyl groups in a proportion equivalent to at least 0.5 mole of the alcohol per mole of glucose unit weight of starch in the presence of an acid catalyst. The resulting mixture is then oxyalkylated to yield a polyether polyol suitable for use in preparating polyurethane foams of excellent physical properties.

U.S. Pat. No. 3,674,717, discloses a process for preparing flame-retardant polyurethane foams by admixing starch with phosphoric acid at an elevated temperature and oxyethylating the resulting mixture to yield a starch-phosphorus-based polyether useful as a reactant in the preparation of urethane foams with flame-retardant properties.

Another method of producing flame retardant polyurethane foams, as disclosed in U.S. Pat. No. 3,658,731 is by reacting either dry whey containing lactose or torula yeast protein with a polyisocyanate in the presence of dimethyl sulfoxide. U.S. Pat. No. 3,629,162 discloses a similar process. Both patents emphasize the important role of the protein in the whey or yeast as a participant in the reaction.

British patent specification No. 1,440,831 claims the production of isocyanurate foams by reactions of isocyanates with tri-, tetra- or higher polysaccharides. The examples however, all require the presence of conventional polyols. Moreover, the reactions require the presence of isocyanurate ring producing catalysts as opposed to polyurethane producing catalysts.

An article in Journal of Cellular Plastics, August, 1967 by Bennett et al describes the preparation of polyurethane foams by reaction of a specific polyol, $N,N,N^1,N^1$-tetrakis(2-hydroxpropyl)ethylene diamine with a polyisocyanate in non-aqueous media in the presence of starch containing not more than 10% moisture. Other products were similarly prepared by replacing the starch with dextrin.

Yet another method for preparing flame-retardant polyurethane foams is disclosed in Applicant's U.S. Pat. No. 4,291,129, wherein the foam composition is based on a polyurethane made from a polyisocyanate, a conventional industrial polyol, an aqueous slurry or solution of untreated carbohydrate, calcium acid phosphate, sodium aluminum sulfate, and sodium bicarbonate. The reactive mixture may contain one or more flame retardants to produce flame resistant foams.

SUMMARY OF THE INVENTION

It has now been discovered that polyurethane foams which may contain fire retardants can be prepared by reaction in an aqueous medium between a polyisocyanate, a carbohydrate and water in the presence of a surfactant and a polyurethane producing catalyst. The reaction mixture may contain sufficient flame retardant to impart flame resistance to the foams produced. This is an improvement over Applicant's invention as described in U.S. Pat. No. 4,291,129, in that the foam composition is made without an industrial polyol. It is surprising to discover that useful foams can be produced from readily available, natural carbohydrates as complete replacements for conventional industrial polyols.

The products of this invention are polyurethane foams produced by reaction between a polyisocyanate and an aqueous slurry or solution of carbohydrate such as cornstarch, corn syrup, fructose, dextrose, sucrose, molasses, cellulose and the like, in the presence of a surfactant and a polyurethane producing catalyst. Conventional additives such as flame retardants, surfactants, pigments, dyes, clays and other organic fillers, and the like may also be present.

Typical flame retardants which may be employed include, for example, sodium chloride, calcium chloride, borax, alkali-metal borates, tricresyl phosphate, tris(2-chloroethyl)phosphate, tris(chloropropyl)phosphate, O,O-diethyl-N,N-bis-(2-hydroxyethyl)aminomethyl phosphate, metal oxides and chlorides such as antimony oxide, alumina, and antimony oxychloride.

The preferred carbohydrates are untreated carbohydrates, that is, carbohydrates which have not been treated to prevent oxidation or to block any of the functional groups, e.g. oxyalkylation of hydroxyl groups. It refers to carbohydrates in which substantially all of the hydroxyl groups are free.

As in the usual foaming procedure, heat generated by the exothermic polymerization reaction causes the water present in the reaction mixture to vaporize. The vapors become entrapped in the foaming mixture as it rises to form the desired cellular structure. Varying the amount of water in the reaction system can be used as one type of control procedure to modify the density and cell structure of the foams to produce products which may be employed for such divergent uses as household sponges, hair curlers, cushions, packing materials, structural materials, and flotation apparatus.

The foams of the present invention are especially useful to retrofit buildings with insulation. For this use, they will usually be prepared in rigid form and will contain flame retardants. A particular advantage of such foams is that, unlike most polyurethane foams which melt and collapse when they are exposed to flame, the foams of this invention tend to maintain their cell structure even when exposed to high temperatures. The foams of the present invention used for retrofit purposes can be prepared under conditions which will generate very low pressure during production so that they can conveniently be used as foam-in-place insulation for existing structures without disengaging the wall parts.

The foams of the present invention can be produced in rigid, semi-rigid and flexible form. The rigid and semi-rigid foams can be converted to flexible foams which are particularly well suited for packaging and cushioning material. To effect this modification, the rigid or semi-rigid foam as produced is fed through heavy rollers to reduce the foam to approximately ⅔ of its original thickness. The conversion to flexible foam does not affect the fire retardant or other properties of the rigid foam.

Polyisocyanates which can be used in the present invention include, for example, methylene diisocyanate; tolylene-2,4-diisocyanate; polymethylene polyphenyl isocyanate; tolylene-2,6-diisocyanate; diphenylmethane 4,4'-diisocyanate' 3-methyldiphenylmethane-4,4'diisocyanate' m- and p-phenylenediisocyanate; naphthalene-1,5-diisocyanate; and mixtures of these products. Either crude or pure isocyanates can be used. A prepolymer polymeric isocyanate which can be prepared by the reaction of an excess of polyisocyanate with a lesser amount of a carbohydrate polyol having more than two hydroxyl groups per molecule can be used in this invention. The combined use of more than two polyisocyanates is also possible.

Water is used with the carbohydrate in the present invention to provide a carrier for the carbohydrates and inorganic salts, and as explained above, is a blowing agent. The amount of water is some formulations is kept at the low end of the hereinafter described range to prevent "sighing", i.e., the collapse of the foam, as well as to aid in the reduction of the pressure of the foaming reaction.

As stated above, the water in the reaction mixture causes the evolution of carbon dioxide, by the reaction of water with isocyanate. The carbon dioxide functions as a blowing agent. For the purpose of adjusting the density of the rigid foams, auxiliary blowing agents such as low boiling hydrocarbons, carbon dioxide, or halohydrocarbons such as chlorofluoroalkanes can be utilized in the reaction mixture. This is analogous to the conventional preparation of polyurethane foams, and the same auxiliary blowing agents are employed. Suitable blowing agents will, as is known, be chemically inert toward the reactants and have boiling points below 100° C., preferably from $-50°$ C. to 70° C. Suitable halohydrocarbons include methylene chloride, ethylenetrichloride, trichloromonofluoromethane, dichlorodifluoromethane, dichlorotetrafluoroethane, and dibromomonofluoroalkane.

For the preparation of the foams of this invention, the carbohydrate may be added to the reaction mixture in the form of an aqueous slurry or solution, which will hereinafter be referred to as a "syrup". The carbohydrate may be conrstarch, cellulose, corn syrup, dextrose, fructose, sucrose, molasses, or the like. The carbohydrate mixture which presently appears to be most suitable is corn syrup, a mixture of sucrose and dextrose, and about 40% fructose. The high-fructose corn syrup is less viscous than regular corn syrup and thus can be poured more readily. In addition, the syrup containing fructose gives a lower density foam with more and smaller cells.

The preferred carbohydrates employed in this invention are water soluble, mono- and disaccharides such as glucose, fructose and sucrose. These are the most readily available carbohydrates, the easiest to react in aqueous media, and presently appear to give the most satisfactory products, especially for packaging foams. The fact that reaction can take place in a mixture containing a relatively high water content markedly decreases the cost of the product.

Oligo and polysaccharides may be used to produce useful foams, but because of their lesser water solubility and reduced reactivity are less preferred. Unless the reaction conditions are appropriately selected, some unreacted carbohydrate may be dispersed in the finished foam. In view of the disclosure of the Bennett et al article referred to above, it is surprising to find that useful products can be produced for these polymeric carbohydrates in the presence of large amounts of water.

The foams of this invention can be prepared by the usual prepolymer and one-shot procedures used with conventional polyols. The usual polyurethane producing catalysts employed in these procedures are also applicable with the process of this invention. These include tin compounds such as stannous octoate, stannous oleate, dibutyltin dioctate, tributyltin acetate, dibutyltin diacetate and dibutyltin dilaurate. The also include certain tertiary amine catalysts such as aliphatic tertiary amines, N-substituted morpholines and N,N'-substituted piperazines; more specifically, triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, N-methylmorpholine, N-ethylmorpholine, bis(2-hydropropyl) 2-methylpiperazine, 2,2,2-(diazabicyclooctane)triethylenediamine, 1,2,4-trimethylpiperazine, triethylenediamine, 2-methyl imidazole, 1,2-dimethyl imidazole, and other polyurethane producing catalysts known to those skilled in the art.

Other catalysts which have been found to be particularly useful in the present invention are aminohydroxy compounds, such as 2-amino-2-methyl-1,1-propanol, tris-(hydroxymethyl)aminomethane, and 2-amino-2-ethyl-1,3-propanediol.

Surfactants which have been found useful in the present invention include, for example, Dow Corning (R) 92-5098 also known as DC 5098, which is a nonhydrolyzable silicone glycol copolymer. Union Carbide's (R) L 5420 is another nonhydrolyzable silicone glycol copolymer which may be used. Other surfactants include Air Products' LK-221 (R), LD-332, and LK-443, all organic surfactants which can be used as a total replacement for the usual silicone surfactants. Other Dow Corning silicone surfactants which can be used in foams made according to the present invention include Dow Corning 190, 191, 193, 196, 197, 198, 1312, F-11-630, 1315, Q2-5023 and Q2-5103.

In the presently preferred process for the production of foams in accordance with this invention, two separate mixtures are first prepared and then blended together. The first mixture is a combination of isocyanate and surfactant. If a flame retardant is employed, it is incorporated in this first mixture. The second mixture contains the carbohydrate, the catalyst and water. Carbohydrate syrups are commercially available containing varying amounts of water, up to about 30% by weight. These syrups can be employed with or without the addition of supplemental water. Alternatively, a dry carbohydrate may be taken up in the selected amount of water.

The final foaming mixture of this invention will normally contain from about 5 to 30% polyisocyanate, 0.05 to 0.4% surfactant, 5 to 30% water, 30 to 60% dry carbohydrate, 0.5 to 2.5% catalyst, all by weight based on the total weight. As stated above, there may be components in the mix such as flame retardants, dyes, pigments and the like. The amount of flame retardants on a percent by weight basis is 5 to 11%.

The desired quantities of each component in the final mix can be obtained by mixing the first mixture with the second mixture at a first to second ratio of from about 0.75:1 to 2:1 by weight, if the mixtures contain the following components in parts by weight based on the total weight of each mixture.

First Mixture
5 to 200 parts by weight polyisocyanate
0.1 to 2.0 parts by weight surfactant
5 to 75 parts by weight flame retardant (optional)

Second Mixture
25 to 120 parts by weight carbohydrate
0.5 to 5 parts by weight catalyst
0.1 to 10 parts by weight auxiliary blowing agent (optional)

-continued up to 30 parts by weight water

As aforesaid, a portion of the water may be provided as the carrier for the carbohydrate, as in the case of commercial syrups.

There may be appreciable variation from the above defined quantities without appreciable adverse effect on the reaction or on the products produced.

To make the foam according to the present invention, the mixture of isocyanate and the mixture of carbohydrate syrup are thoroughly mixed together. The resulting mixture, which is liquid, may be introduced into a mold or behind a wall to form the foam into the desired shape. The ingredients can be combined in a commercially available mixing gun for introduction into a mold. The procedures employed are, in fact, the same procedures which are applicable to the preparation of foams with industrial polyols.

The mixing ratio of isocyanate mix to carbohydrate mix is from 0.75:1 to 2:1, preferably 1:1 to 1.5:1, by weight.

The flame retardant foams of this invention manifest excellent properties when exposed to flame generating conditions. The following results have been achieved when samples of the foam have been tested under tests recommended by Underwriter Laboratories and the American Society For Testing Materials.

| ASTM E84-80 | Flame Spread 20 |
| UL-94 | 94 VO Classification |
| ASTM 2863-77 | Limiting oxygen index, more than 31% |
| ASTM D-240-80 | Heat of combustion - 8630 BTU/lb |

ASTM E-84-80—Steiner Tunnel Test is used to test and rate the performance of building materials under high intensity fire conditions. The best fire rating given under this well known test procedure, Class I, requires a flame spread of no higher than 25 on a scale which gives a flame spread value to untreated red oak of 100.

UL 94—Devised by Underwriters Laboratories, this procedure tests the flammability of plastic materials used for parts in devices and appliances in response to heat and flame under controlled laboratory conditions. This vertical burn test provides for four classifications - 94 V-0, 94 V-1, 94 V-2, and 94-5 V. The 94 V-0 classification is the best given under this demanding flammability test procedure.

ASTM D-2863-77—This procedure measures how much oxygen is required (the Limiting Oxygen Index) to support flaming combustion and is used in testing various kinds of plastic materials.

Air under standard conditions contains just under 21% oxygen by volume. To support burning of the foam tested requires 48% more oxygen than is contained in earth's atmosphere. A limiting oxygen index in excess of 30% is quite high and indicates a material which will not burn except with great difficulty under normal circumstances.

ASTM D-240-80—Emerson Bomb Calorimeter Test measures the amount of heat (Btu's per pound) that a given material contributes in a fire situation measured under specific laboratory conditions. It is assumed that the lower the figure obtained in this test, the less the material will contribute in a real fire situation. The normal test figures for urethanes is 13,000 Btu's.

The following non-limiting examples are given by way of illustration only.

EXAMPLE 1

An isocyanate mix was containing 100 parts by weight polymethylene polyphenyl isocyanate (Mobay MONDUR MR), 1 part by weight Union Carbide L 5340 surfactant, and 25 parts by weight Stauffer FYROL CEF tris(2-chloroethyl)phosphate, flame retardant. A carbohydrate syrup mix was made containing 100 parts by weight corn syrup (about 6% water) and one part by weight 2-amino-2-methyl-1-propanol catalyst. The two mixtures were mixed in a mixing tank of suitable capacity with an electric mixer. The final mixture was poured into a mold simulating a wall cavity, where it foamed and provided excellent bonding to all the surfaces of the mold.

EXAMPLE 2

An isocyanate mix was made containing 100 parts by weight polymethylene polyphenyl isocyanate (Mobay MONDUR MR), 1 part by weight Dow Q2 5098 silicone surfactant, and 20 parts by weight Stauffer FYROL CEF, tris(2-chloroethyl)phosphate, flame retardant. A carbohydrate syrup mix was made containing 100 parts by weight high-fructose corn syrup (about 40% fructose, 6% water) and one part by weight 2-amino-2-methyl-1-propanol catalyst. The two mixtures were mixed in a mixing tank of suitable capacity with an electric mixer. The final mixture was poured into a mold, where it foamed and provided excellent bonding to all surfaces of the mold. The foam was lighter in weight and had more and smaller cells than the foam of Example 1.

EXAMPLE 3

A rigid polyurethane foam made according to the process of Example 1 was prepared in the form of a slab 3 inches thick. The slab was crushed between rollers to a thickness of about 2 inches. The resulting flexible foam retained its flame retardancy, making it suitable for use as a packaging material.

EXAMPLES 4 TO 20

A variety of foams of differing densities were prepared from foaming reactants containing different catalysts and different surfactants.

The procedure was to mix the carbohydrate syrup (Isosweet 5500, a high fructose corn syrup available from Staley Industrial Products containing principally fructose and dextrose at a solids content of about 75% and water content of about 25%) and the catalyst in a small plastic container. The polyisocyanate, flame retardant and surfactant were mixed in another plastic container. The two compositions were thoroughly mixed and poured into a mold. The foam was allowed to freely rise in the mold and then left standing for a few hours to cure. The results are shown below. The surfactants are silicone surfactants available from Union Carbide (UC) and Dow Corning (DC). The catalysts identified by the designation D-T is Dabco T available from Air Products, Inc. The A-designation refers to catalysts available from Union Carbide. The catalysts are all understood to be tertiary amines.

| EXAMPLE | SURFACTANT | CATALYST | DENSITY |
|---|---|---|---|
| 4 | UC 5340 | D-T | 0.917 |
| 5 | UC 5350 | A-10 | 0.906 |
| 6 | UC 540 | D-T | 0.927 |
| 7 | UC 540 | A-10 | 0.965 |
| 8 | UC 540 | D-T | 0.967 |
| 9 | UC 540 | A-1 | 0.921 |
| 10 | UC 5420 | D-T | 0.954 |
| 11 | UC 5420 | A-10 | 1.013 |
| 12 | UC 5421 | D-T | 0.956 |
| 13 | UC 5421 | A-1 | 0.860 |
| 14 | UC 5750 | A-1 | 0.959 |
| 15 | UC 5750 | A-10 | 1.072 |
| 16 | DC 193 | D-T | 0.970 |
| 17 | DC 193 | A-1 | 1.008 |
| 18 | DC 5098 | D-T | 0.930 |
| 19 | LK 221 | D-T | 1.008 |
| 20 | LK 443 | D-T | 0.966 |

The reactants in parts by weight were as follows:

| | |
|---|---|
| Isosweet 5500 | 98 |
| Catalyst | 2 |
| MONDUR MR | 105 |
| CEF | 45 |
| Surfactant | Variable from 0.1 to 1 |

EXAMPLES 21 TO 26

A similar set of examples was conducted utilizing the same catalysts and surfactants, but varying the polyisocyanate. The results are shown below.

| EXAMPLE | ISOCYANATE | SURFACTANT | CATALYST | DENSITY |
|---|---|---|---|---|
| 21 | Mondur MR | UC 5340 | D-T | 1.125 |
| 22 | Luprinate M-20 | UC 5340 | D-T | 1.062 |
| 23 | Papi 20 | UC 5340 | D-T | 1.092 |
| 24 | Papi 29 | UC 5340 | D-T | 0.907 |
| 25 | Papi 135 | UC 5340 | D-T | 0.889 |
| 26 | Papi 580 | UC 5340 | D-T | 1.130 |

Mondur MR is available from Mobay, Luprinate is available from BASF-Wyandotte and Papi is available from Upjohn. All are understood to be principally 4,4'-diphenylmethane diisocyanate.

EXAMPLE 27

In a one quart wax lined paper cup, 10 parts by weight of water were mixed with 90 parts by weight sucrose by rapid stirring at 2200 rpm with a stirrer with a 2 inch diameter double 3 blade marine type propeller for 30 seconds. To this slurry there was added 150 parts by weight of Mobay E-534 isocyanate blend, and stirring was continued for 15 seconds. The mix was poured into an 8" by 8" by 6" mold at ambient temperature. The resulting foam was well formed, of good appearance and would be classified as a rigid or semi-rigid foam.

Mobay E-534 is a blend of 70 parts by weight Mondur MR, 30 parts by weight CEF and 1 part by weight Dow Corning 5098 silicone surfactant.

EXAMPLE 28

The procedure of Example 27 was repeated replacing the sucrose with dextrose. The results were substantially the same.

EXAMPLE 29

Example 27 was repeated except that before the E-534 was added to the sucrose slurry, sufficient Freon-F-11 was added to a constant weight into the sucrose slurry so that it contained 10 parts by weight of the auxiliary blowing agent.

The resulting foam was of somewhat lower density than the foam of Example 27, but, both foams were similar in appearance.

EXAMPLE 30

Example 28 was repeated except that before the E-534 was added to the dextrose slurry, sufficient methylene dichloride was added to a constant weight into the dextrose slurry so that it contained 5 parts by weight of the auxiliary blowing agent.

The resulting foam was of somewhat lower density than the foam of Example 28, but both foams were similar in appearance.

What is claimed is:

1. A mixture useful for the preparation of polyurethane foams comprising an untreated carbohydrate in which substantially all of the hydroxyl groups are free, water and a polyurethane producing catalyst.

2. A mixture as in claim 1 comprising from 25 to 120 parts by weight carbohydrate, 0.5 to 5 parts by weight catalyst and up to 30 parts by weight water, all based on the total weight.

3. A mixture as in claim 1 or 2 wherein the carbohydrate is selected from the group consisting of cornstarch, cellulose, corn syrup, dextrose, sucrose and molasses.

4. A mixture as in claim 1 or 2 wherein the carbohydrate is cornstarch.

5. A mixture as in claim 1 or 2 wherein the carbohydrate is corn syrup.

6. A mixture as in claim 1 or 2 wherein the catalyst is selected from the group consisting of stannous octoate, stannous oleate, dibutyltin dioctate, tributyltin acetate, dibutyltin diacetate, dibutyltin dilaurate, triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, N-methylpiperazine, 2,2,2-(diazabicyclooctane)triethylenediamine, 1,2,4-trimethylpiperazine, triethylenediamine, 2-methyl imidazole, 1,2-dimethyl imidazole, 2-amino-2-methyl-1,1-propanol, tris-(hydroxymethyl)aminomethane, 2-amino-2-ethyl-1,3-propanediol.

7. A mixture as in claim 1 or 2 wherein the carbohydrate is selected from the group consisting of cornstarch, cellulose, corn syrup, dextrose, sucrose and molasses, and the catalyst is selected from the group consisting of stannous octoate, stannous oleate, dibutyltin dioctate, tributyltin acetate, dibutyltin diacetate, dibutyltin dilaurate, triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, N-methylpiperazine, 2,2,2-(diazabicyclooctane)triethylenediamine, 1,2,4-trimethylpiperazine, triethylenediamine, 2-methyl imidazole, 1,2-dimethyl imidazole, 2-amino-2-methyl-1,1-propanol, tris-(hydroxymethyl) aminomethane, 2-amino-2-ethyl-1,3-propanediol.

8. A mixture as in claim 1 or 2 wherein the carbohydrate is corn syrup and the catalyst is selected from the group consisting of stannous octoate, stannous oleate, dibutyltin dioctate, tributyltin acetate, dibutyltin ethanol, diethylcyclohexylamine, lauryldimethylamine, triethanolamine, tetrakis(2-hydroxypropyl)ethylenediamine, N,N,N',N'-tetramethylethylenediamine, N-methylpiperazine, 2,2,2-(diazabicyclooctane)triethylenediamine, 1,2,4-trimethylpiperazine, triethylenediamine, 2-methyl imidazole, 1,2-dimethyl imidazole, 2-amino-2-methyl-1,1-propanol, tris-(hydroxymethyl)aminomethane, 2-amino-2-ethyl-1,3-propanediol.

9. A mixture as in claim 1 or 2 wherein the carbohydrate is corn syrup and the catalyst is selected from the group consisting of stannous octoate, stannous oleate, dibutyltin dioctate, tributyltin acetate, dibutyltin diacetate, dibutyltin dilaurate, triethylamine, dimethylaminoethanol, diethylcyclohexylamine, lauryldimethylamine, triethanolamine, tetrakis(2-hydroxypropyl)ethylenediamine, N,N,N',N'-tetramethylethylenediamine, 1,2,4-trimethylpiperazine, triethylenediamine, 2-methyl imidazole, 1,2-dimethyl imidazole, 2-amino-2-methyl-1,1-propanol, tris-(hydroxymethyl)aminomethane, 2-amino-2-ethyl-1,3-propanediol.

* * * * *

UNITED STATES PATENT AND TRADEMARK OFFICE
CERTIFICATE OF CORRECTION

PATENT NO. : 4,417,998
DATED : November 29, 1983
INVENTOR(S) : Richard B. Kennedy It is certified that error appears in the above—identified patent and that said Letters Patent is hereby corrected as shown below:

On the title page, insert ---The term of this patent subsequent to August 23, 2000 has been disclaimed.

Signed and Sealed this

Twentieth Day of November 1984

[SEAL]

Attest:

GERALD J. MOSSINGHOFF

*Attesting Officer*    *Commissioner of Patents and Trademarks*